J. LUCAS.
ROTARY-ENGINE AND WATER-WHEEL.
No. 173,030. Patented Feb. 1, 1876.
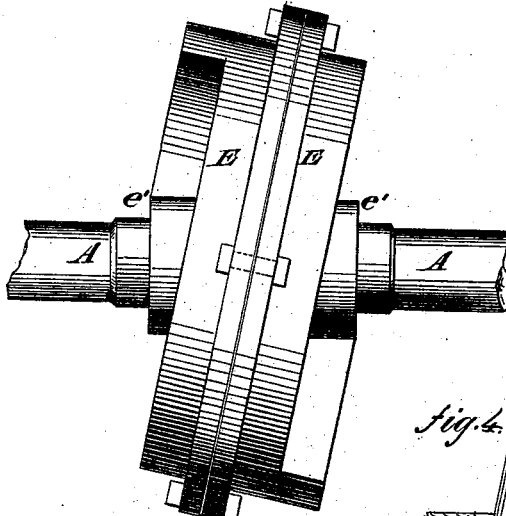
Fig. 1.
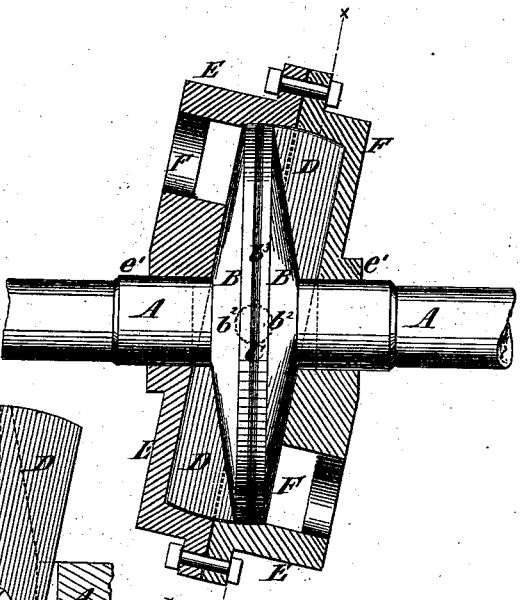
Fig. 2.
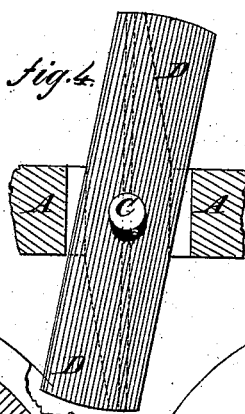
Fig. 4.
Fig. 3.
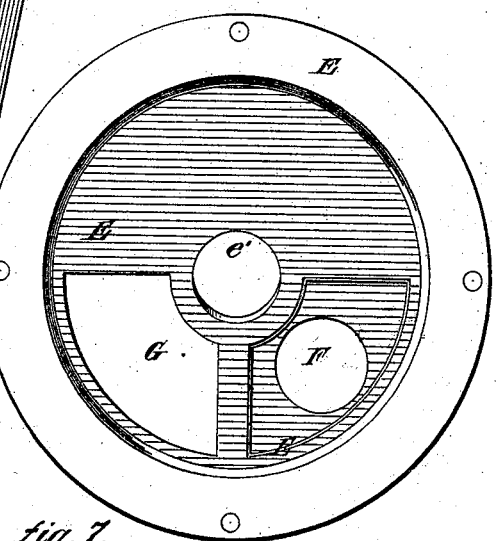
Fig. 5.
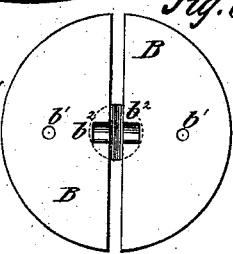
Fig. 6.
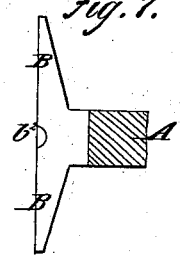
Fig. 7.
WITNESSES:
Gustav Dieterich
A. F. Roberts
INVENTOR:
J. Lucas
BY
ATTORNEYS.

UNITED STATES PATENT OFFICE.

JOHN LUCAS, OF HASTINGS, MINNESOTA.

IMPROVEMENT IN ROTARY ENGINES AND WATER-WHEELS.

Specification forming part of Letters Patent No. 173,030, dated February 1, 1876; application filed October 29, 1875.

*To all whom it may concern:*

Be it known that I, JOHN LUCAS, of Hastings, in the county of Dakota and State of Minnesota, have invented a new and useful Improvement in Rotary Engine and Water-Wheel, of which the following is a specification:

Figure 1 is a side view of my improved machine. Fig. 2 is the same view as Fig. 1, but showing the case in section through the line $w\,w$, Fig. 3. Fig. 3 is a section of the case, taken through the line $x\,x$, Fig. 2, and showing the flat side of one-half of the piston-wheel, and the piston in edge view. Fig. 4 is a side view of the piston, showing the piston-wheel in dotted lines, and a portion of the shaft in section. Fig. 5 is a detail view of the inner side of one-half of the case. Fig. 6 is a detail view of the inner or flat side of one-half of the piston-wheel. Fig. 7 is a detail section of the same, taken through the plane of the slot.

Similar letters of reference indicate corresponding parts.

The object of this invention is to furnish an improved engine or wheel, which may be driven by steam or water, and which shall be simple in construction, reliable in operation, economical in use, doing its work without wasting the steam or water, and not liable to get out of order.

The invention consists in the construction of a revolving piston-wheel, which is formed of two parts, in diametrical registering-slots, in which is arranged a piston-plate, the pivots or journals of which are seated in recesses made in the parts of the piston-wheel. The pivoted piston is arranged to rock or oscillate in a line at right angles to the rotation of the piston-wheel, by the action of the water or steam admitted into the engine-casing, which casing is provided with an oblique opening for the passage of the piston-wheel shaft, so as to cause the beveled sides of the piston-wheel to bear against the inner sides of the casing.

The pivoted piston-plate is made in two or more parts, to adapt it to receive and hold packing between said parts.

A is the shaft, which is made in two parts. Upon the inner ends of the parts of the shaft A are formed the halves or parts of the piston-wheel B, the inner or adjacent sides of which are made flat, so as to fit upon each other, where they are secured in place by screws $b^1$. The outer sides of the wheel B are beveled, as shown in Figs. 2 and 7, and in dotted lines in Fig. 4. The piston-wheel B is slotted in line with the shaft A, which slot extends a little into the said shaft A, as shown in Figs. 4 and 7. In the middle parts of the inner sides of the parts of the wheel B, and at right angles with the slot in said wheel B, are formed semi cylindrical recesses $b^2$, to receive the pivot C, formed upon the center of the piston D. The recesses $b^2$ may be made larger than the pivot C, to receive anti-friction bearings for said pivot, to prevent wear and secure ease of movement.

The piston D is made with straight and parallel side edges, and with rounded ends, as shown in Figs. 2 and 4. The piston D may be made in two or more parts, so as to receive packing $d'$ between them, to project a little at the side and end edges, to bear against the walls of the case, and thus make the piston steam and water tight. Packing $b^3$ may also be clamped between the parts of the piston-wheel B, to project sufficiently to bear against the walls of the case, to make the said wheel steam and water tight.

E is the case, which is made in two parts, which are made with flanges upon their adjacent edges, to receive the bolts by which they are secured to each other. Through the center of the case E is formed an oblique hole, $c'$, to receive the shaft A, the inclination of said hole being such that the inner surfaces of the two parts of the case E upon the opposite sides of the shaft A may bear squarely against the opposite beveled sides of the piston-wheel B, as shown in Fig. 2. F is the inlet-port, and G is the outlet-port, which are formed in the case E upon the opposite sides of and close to the parts of the said case that bear against the surface of the piston-wheel B, so that the steam or water cannot pass from the one to the other of said ports.

Having thus described my invention, I claim as new and desire to secure by Letters Patent—

1. The piston-wheel B, composed of two parts, formed with the shaft A, and having beveled outer sides and flat adjacent surfaces, with recesses $b^2$ therein, and the rocking or oscillating piston-plate, provided with journals $b$, in combination with the casing E, having an oblique central shaft-opening, $e'$, and inlet and exhaust ports F G, all constructed and relatively arranged as herein set forth and shown.

2. The rocking piston-plate D, provided with journals C C, in combination with the revolving piston-wheel B, having recesses $b^2$, and a slot extending through its sides and periphery, as and for the purpose shown.

3. The piston D, made in two or more parts, to adapt it to receive and hold packing $d'$ between said parts, substantially as herein shown and described.

JOHN LUCAS.

Witnesses:
W. H. DE KAY,
FRANK H. FREAR.